Dec. 18, 1934.  F. VAN DER WOUDE  1,984,442
SPEED CONTROL MECHANISM
Original Filed May 19, 1930  4 Sheets-Sheet 1
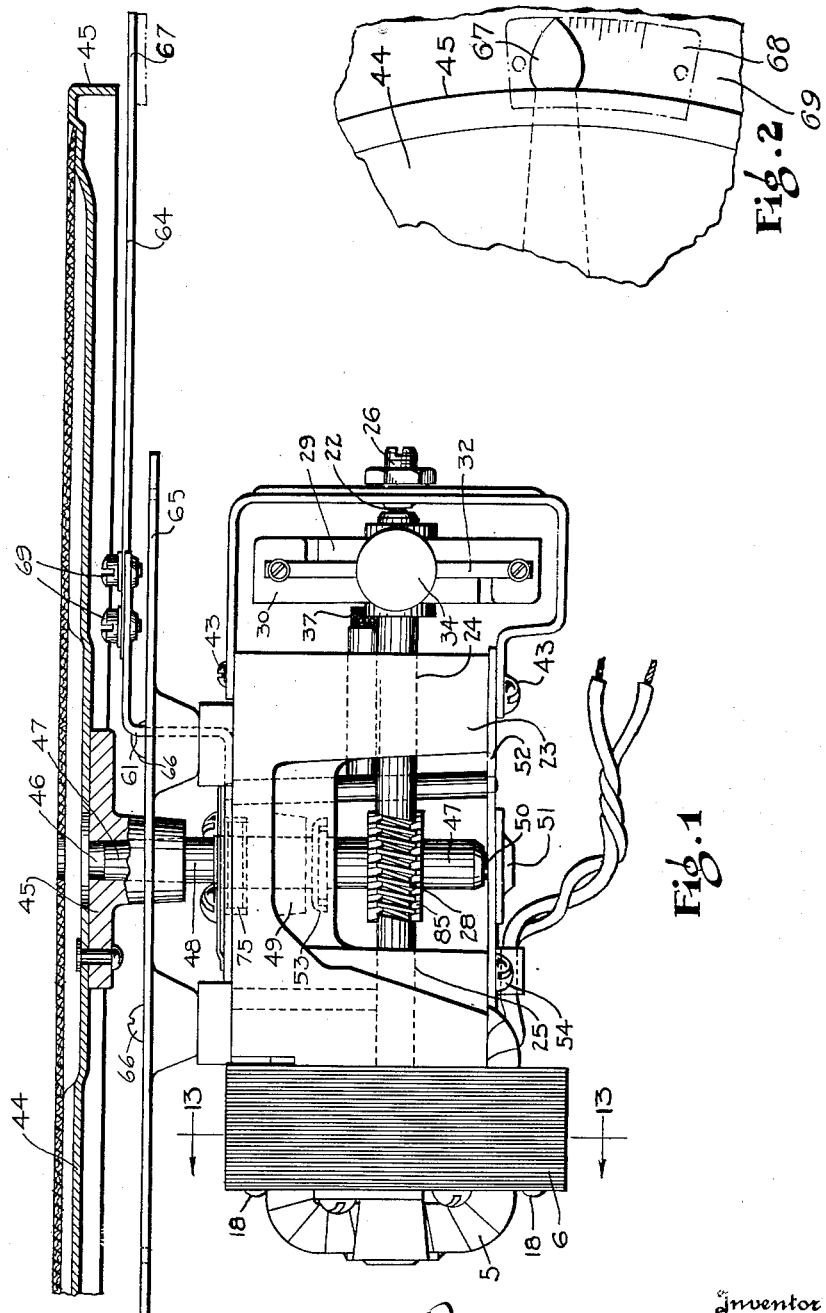

Dec. 18, 1934.  F. VAN DER WOUDE  1,984,442
SPEED CONTROL MECHANISM
Original Filed May 19, 1930  4 Sheets-Sheet 2

Inventor
Fritz Van Der Woude
By Slough + Canfield
Attorneys

Dec. 18, 1934.  F. VAN DER WOUDE  1,984,442
SPEED CONTROL MECHANISM
Original Filed May 19, 1930   4 Sheets-Sheet 3
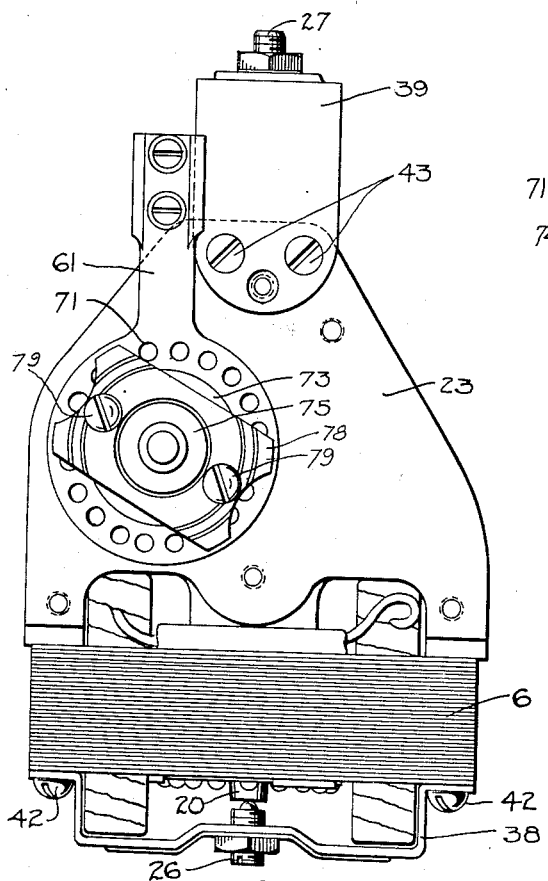
Fig.5
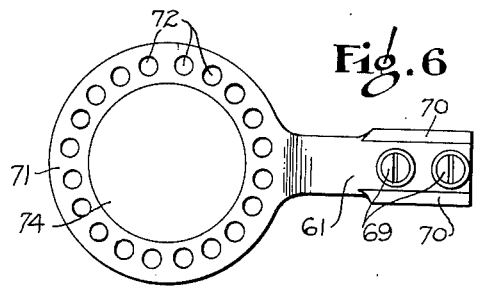
Fig.6
Fig.7
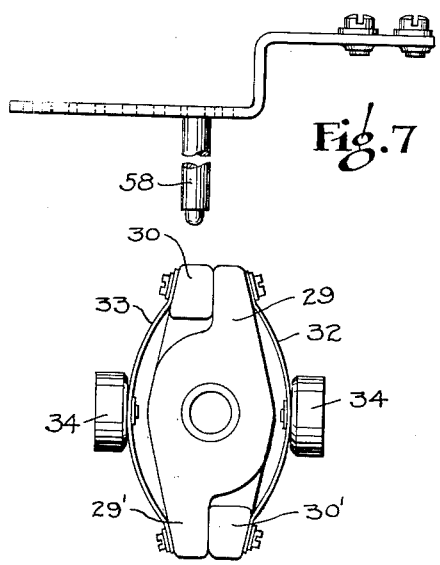
Fig.8
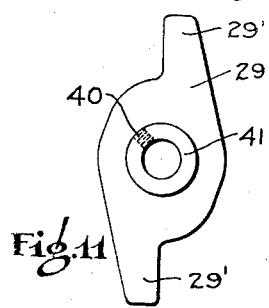
Fig.11
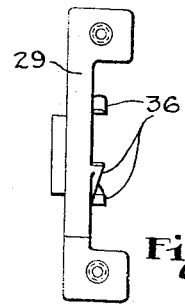
Fig.10
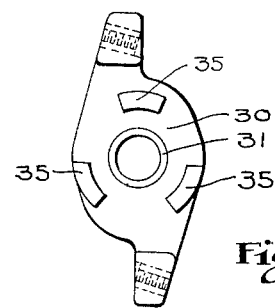
Fig.9
Fig.12
Inventor
Fritz Van Der Woude
Slough & Canfield
Attorneys

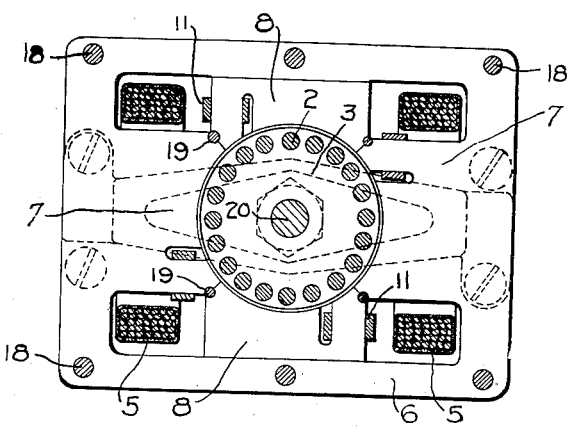
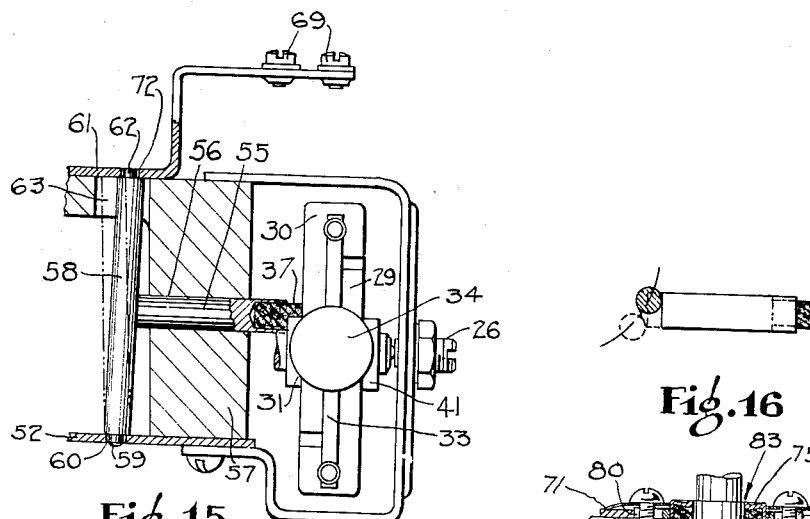
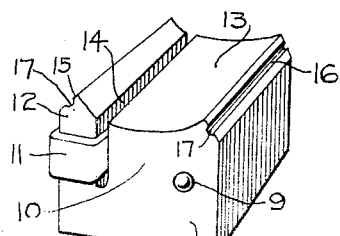
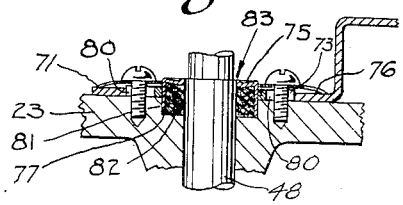

Patented Dec. 18, 1934

1,984,442

UNITED STATES PATENT OFFICE 1,984,442

SPEED CONTROL MECHANISM

Fritz van der Woude, Elyria, Ohio, assignor to The General Industries Company, Elyria, Ohio, a corporation of Ohio Application May 19, 1930, Serial No. 453,627
Renewed October 30, 1933

18 Claims. (Cl. 188—187)

My invention relates to motors and governors therefor, and relates particularly to motors and governors which are particularly applicable to driving at a constant reduced speed an element of a mechanism such as a turntable of a phonograph.

Phonograph turntables which are required to be rotated at a very constant speed must come up to speed rapidly when the motor is started and if driven by an electric motor must provide in its governing mechanism means whereby the rotational rate of speed of the turntable will not objectionably vary even during periods of considerable variation in the voltage of electric current applied to the motor.

It is highly desirable also in the commercial manufacture of mechanisms of this kind that the phonograph turntable driving mechanism comprising the motor, the governor and the driving shaft for the turntable be incorporated in a compact unitary mechanism susceptible of ready replacement and/or for shipment in units from the manufacturer of the motor and governing apparatus to the phonograph manufacturer who installs them in phonograph casings.

It is, therefore, an object of my present invention to provide as a compact unitary apparatus, not readily susceptible of derangement, an improved combined electric motor driving and motor governing mechanism.

Another object of my invention is to provide an improved electric motor.

Another object of my invention is to provide an improved governing mechanism for motors.

Another object of my invention is to provide an improved governor and adjusting means therefor.

Another object of my invention is to provide for the attainment of any and all of the aforesaid objects in an improved mechanism which is not expensive to manufacture and the parts of which may be readily assembled in an inexpensive manner and which when assembled will operate as a complete unitary mechanism in an efficient manner.

Another object of my invention is to provide relatively noiseless improved means for driving a rotatable means such as a phonograph turntable at a substantially constant rate.

Another object of my invention is to provide improved means for a phonograph turntable governor susceptible of advantageous disposition for manual operation.

Another object of my invention is to provide a governor mechanism comprising a lever which is mounted for movement concentrically with the axis of the turntable of a phonograph driven by the mechanism governed by the governor, and to provide further means for projecting the manually engageable end of a lever to any desired side of the phonograph turntable.

Other objects of my invention and the invention itself will become apparent by reference to the following description of an embodiment of my invention illustrated more or less diagrammatically in the accompanying figures of drawings, wherein:—

Fig. 1 illustrates partly in side elevation a mechanism embodying my invention with a phonograph turntable, shown in diametrical section, to be driven thereby, applied thereto;

Fig. 2 is a plan view of an end fragment of the turntable and the end of a combination speed indicating hand and manually operable lever for adjusting the speed disposed below and projecting beyond an edge of the turntable;

Fig. 5 is a plan view of the motor and governing mechanism similar to that of Fig. 3 except that the mounting plate for the mechanism is in this view omitted;

Figs. 6 and 7 are plan and side elevational views, respectively, of an adjustable regulating lever and cam for the governor;

Fig. 8 is an end elevational view of the centrifugally operable elements of the governor mechanism;

Figs. 9, 10, 11 and 12 are, respectively, inside elevational, side elevational, end elevational and plan views of one of a pair of like complementary centrifugally operable cam elements of the governor mechanism;

Fig. 13 is a section taken on the line 13—13 of Fig. 1;

Fig. 14 is a perspective view of one of a pair of insertable poles for the motor of Fig. 13;

Fig. 15 is a side elevational view of fragments of the adjusting mechanism for the governor regulating brake;

Fig. 16 is a view in solid and dotted lines showing different relative positions of the camming rod and brake rod for the governor mechanisms.

Fig. 17 is a fragmentary sectional view of adjusting elements of the governing mechanism.

Figure 3:
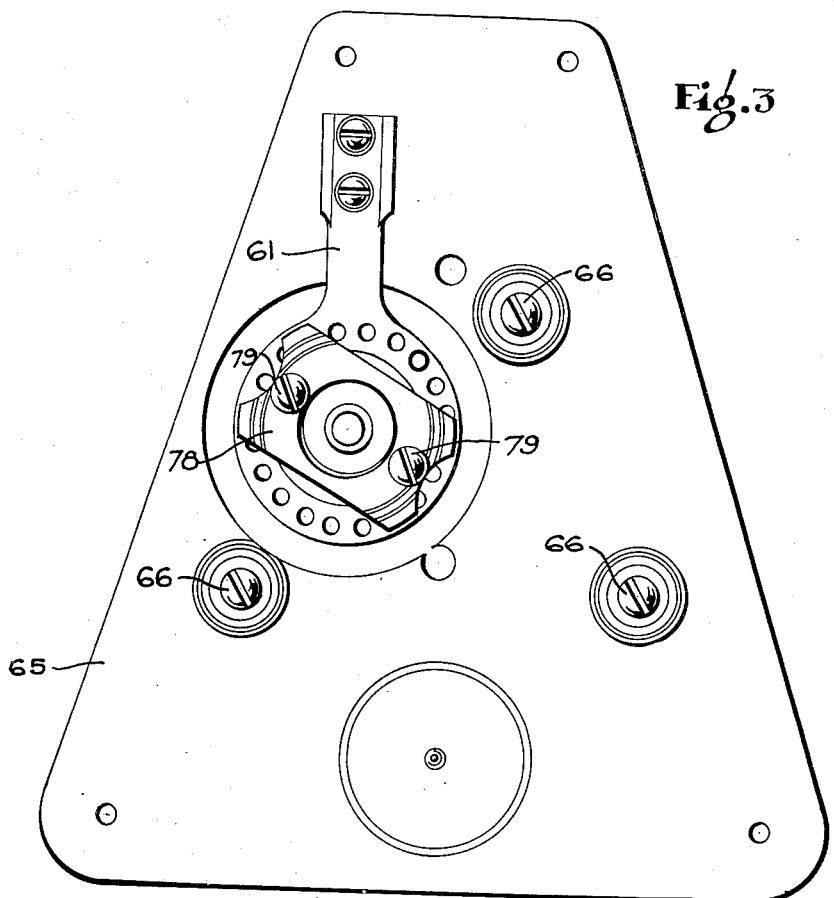
Fig. 3 is a top plan view of the motor and governing mechanism having a top plate therefor affixed thereto.
Figure 4:
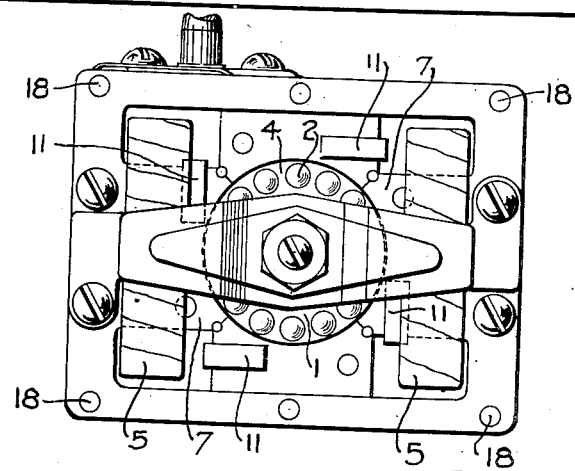
Fig. 4 is an end view particularly of the electric motor for driving the mechanism.

Referring now to the different figures of drawings, in all of which like parts are designated by like reference characters, the electric motor of my invention is of the inductor type and comprises a rotor 1, which is made up by superposing a plurality of suitably apertured iron or alloy steel disks 3, disposing them intermediate a pair of relatively heavy end disks 4, and projecting a plurality of parallel spaced copper rods 2 through the disks intra-peripherally thereof, the ends of the rods being electrically joined to the end plates.

Rotors of this type which are exemplified in the disclosures of Patent No. 677,308 to Eichenmeyer, dated June 25, 1901, are well known and will require no further description.

As illustrated, I preferably provide a pair of energizing field windings 5 for the stationary field of the motor which comprises a rectangular outer frame 6 made up of superposed iron or steel alloy stampings with a pair of integral field pole projections 7, projected inwardly from two opposite ends of the frame, between which the rotor 3 is journalled for rotation. An intermediate pair of relatively oppositely disposed field poles 8 are likewise provided, but each of which is separately made up by providing a plurality of separate stampings 8', each of suitable like form, superposing the stampings in the manner illustrated in Fig. 14, then riveting them together by an iron rivet 9 projected through a main pole portion 10 and forcing a heavy copper collar 11 over a supplemental pole fork 12. The pole pieces thus formed are provided with an arcuate pole face 13 interrupted by the slot 14 dividing the main and supplemental poles 10 and 12, respectively, the corners being removed as shown at 15 and 16 to provide inclined corner faces and each of the corner faces 15 and 16 are provided with longitudinally extending grooves 17.

The poles 7 are similarly formed at their ends. In assembling the motor, the outer frame 6 is first assembled by superposing its laminations and riveting them together as by means of the rivets 18, then by placing the field energizing coils 5 on the inwardly projecting poles 7, then by sliding the intermediate poles 8, one of which is shown in Fig. 14 in perspective view, into place, as shown in Fig. 13 and then tightly driving rods 19 of copper, brass or like material into place in the space provided by the grooves 17 between the inclined faces 15 and 16 of the poles 8 and the contiguous like inclined faces of the poles 7.

In this manner the poles 8 are tightly wedged into place and brought into intimate pressure contact with the side elements of the outer frame 6 to make a good magnetic circuit connection therewith.

The rotor shaft 20 is journalled in the cast iron frame 23 at 24 and 25, within suitable non-friction bushings, not shown, and makes a thrust bearing contact by its ends at 21 and 22 with adjustable thrust screws 26 and 27 at the two ends of the frame. The end thrust screws 26 and 27 are, respectively, mounted in brackets 38 and 39 which are respectively secured by screws 42 and 43 to the frame 23.

Intermediate its ends, the shaft is provided with a screw thread to form a worm gear pinion 28. Near its end 22 a pair of centrifugally operable governor elements 29 and 30, like that shown in Figs. 9 to 12, inclusive, are positioned on the shaft in relatively opposed relation. The outer element 29 is rigidly affixed to the shaft being secured thereto by a screw extending through the threaded opening 40 of its hub 41, and receives rotary movement therefrom, the other element 30 being loosely journalled by its hub 31, Fig. 9, onto the shaft and slightly longitudinally movable thereon relative to the element 29. The two elements are resiliently joined together by a pair of thin relatively narrow leaf springs 32 and 33, each of which joins opposite ends of the elements 29 and 30 on the same side of the shaft. The leaf springs 32 and 33 are secured so closely together that at all times they are forced to take a slightly bowed sprung form as illustrated in Fig. 8 and resiliently tending to resume their straightened form, forcing the overlapped ends 29' and 30' of the elements 29 and 30, respectively, into mechanical contact.

When the elements 29 and 30 are rotated by operation of the motor through the element 29 secured to the motor shaft, the centrifugal weights 34, which are intermediately disposed on the springs 32 and 33 are thrown outwardly to effect a pulling apart of the ends 29' and 30' of the centrifugal elements to effect a relative rotation of said elements on the shaft. On the inner face of each of the elements and in relative engagement each with the other, are spaced cam-like projections 35 for the elements 30 and 36 for the element 29 and upon rotary movement effected by driving of the motor shaft, these cam projections will ride each on the other to increase the longitudinal spacing between the elements to effect movement of the element 30 toward the friction pad 37, which is disposed adjacent to the inner face of said element 30 and frictionally engageable therewith upon a movement of the element 30 longitudinally of the motor shaft toward the motor, beyond a predetermined degree. The frictional contact had with the element 30 tends to restrain the speed of rotation of the shaft, variably according to the pressure of contact, that is according to the speed of the motor, and the initial relative positioning of the pad 37 and the braking surface of the element 30.

The operation of the governor mechanism so far as described is fully disclosed in my co-pending application, Serial No. 387,143, filed August 20, 1929, to which reference may be had and wherein such governor mechanism is specifically claimed.

The phonograph turntable 44 is provided with a centrally disposed hub 45 having a tapered bore 46, adapted to fit snugly onto the similarly tapered end 47 of the turntable shaft 48, which is journalled in a depending boss 49 of an upper wall of the casing 23 and making a thrust bearing engagement at 50 within a sheet metal bearing cup 51, which is affixed to a sheet metal frame element 52 which is secured to the iron casting frame portion 23 by one of the screws 43 at the bottom of the frame, and by a second screw 54, means comprising a collar 53 intermediately secured on the shaft 48 adjacent the end of the frame casting boss 49 is engageable with the end of said boss to prevent the shaft 48 being longitudinally moved to the upper wall of the frame 23.

The governor friction pad 37 is supported in an end recess of a brake thrust rod 55 which is journalled for longitudinal movement in a bore 56 of an arm 57 of the frame casting, with its opposite two ends, one of which contains the pad 37, projecting from the ends of the bore. Longitudinal adjustment of the pad 37 relative to the movable centrifugal element 30 is effected by adjustably tilting a cam rod 58 which is adapted to be rocked about its reduced end 59 positioned within an aperture 60 of the casing element 52 by a lever 61 into an aperture of which the reduced end 62 of the rod 58 is loosely received. The upper end of the rod 58 projects through a bore 63 of the top wall of the frame casting and is of such reduced size relative to said bore as to be susceptible of considerable lateral movement therein. The lever 61 is provided with an extension arm 64, which projects between the plate 65 affixed by screws 66 in spaced relation to the top wall of the casting 23, and below the turntable 44 beyond whose periphery 45 a pointer and manually operable end 67 of the arm 64 projects.

A reference scale 68 is preferably provided on the mounting board, a fragment only of which is shown at 69, Fig. 2, to which the apparatus of my invention by its mounting plate 65 is affixed. The extension arm 64 for the lever 61 is secured to such lever by a pair of screws 69 projected through the arm and into threaded openings of the lever. The lever comprises a pair of side flanges 70 between which the connected portion of the arm is received and which tend to cap the arm in proper alignment. The lever is journalled concentrically with the turntable shaft 47 on the plane top wall of the frame 23 by its annular end 71 forming an integral part of the lever 61, and which is provided with a plurality of perforations 72 disposed entirely all around the said annular portion, hereinafter designated as the lever annulus. The annulus is positioned in such concentric position relative to the turntable shaft by the provision of a spacing annulus 73 telescoped within the central opening 74 of the annulus 71, and which is fitted around a central bushing 75 rigidly secured to the frame 23 by a tubular portion fitted snugly within the bore of the frame top wall through which the turntable shaft 48 is projected.

The relative positioning of the annulus 71, the annulus 73 and the bushing 75 is best illustrated in Fig. 17, which shows these parts in sectional view. By referring particularly to Fig. 17, it will be seen that the bushing 75 is in the form of a sheet metal cup having a centrally perforated end wall projecting slightly above the top wall of the frame casting 23, and the spacing annulus 73 is interposed between the upwardly projecting annular portion of the bushing 75 and the annulus 76, the annulus 76, the annulus 73 and the bushing 75 being all coaxial with the shaft 48 and maintained in position relative thereto by the fixed bushing 75 anchored in the top recess 77 of the frame casting.

The spring retainer 78 is secured to the frame casting by a pair of screws 79 which project through a pair of oppositely disposed slots 80 of the annulus 73, the screws 79 preventing relative rotation of the annulus 73. The space provided within the tubular portion 81 of the bushing 75 is preferably filled with an annular piece of felt 82, telescoped over the shaft 48 and oil directed as indicated by the arrow 83, Fig. 17, will flow along the shaft 48 and be absorbed by the felt annulus 82 to continuously lubricate the shaft bearing disposed immediately below the recess 77.

The reduced end 62 of the tiltable camming rod 58 is adapted to be projected into whichever of the apertures 72 of the lever annulus 71 may be positioned above the frame casting bore 63, and therefore in assembling the mechanism, the annulus 71 may be rotated to project its lever end 61 in any desired rotative direction, and therefore the indicating and manually operable end 67 may be projected to any side of the turntable.

This arrangement is of great advantage to the motor manufacturer who ships motors with governors to different manufacturers of phonographs and who desire to install the motors in phonograph cabinets with differently arranged facilities for providing the scale 68 on different sides of the turntable.

A worm gear 85 is rigidly affixed to the turntable shaft 48 near its lower end and meshes with the worm pinion 28 of the motor shaft, whereby the turntable shaft 48 may be driven at a reduced speed by the motor shaft, under the control of the governor mechanism described, subject to adjustments thereof through the lever 61, in the manner related.

From the above it is apparent that when the annulus 71 is rotated about the axis of the shaft 48 that the tiltable cam rod 58 will variably thrust the thrust brake rod 55 to vary the frictional contact had between the brake pad 37 and the brake surface of the centrifugally operable element 30, to vary the governed motor speed.

Having thus described my invention in a certain embodiment, I am aware that numerous and extensive departures may be made from the embodiment herein illustrated and described but without departing from the spirit thereof.

I claim:

1. In a device of the class described, a rotary speed governor element, provided with a brake surface, a brake shoe adapted to frictionally engage the brake surface to exert a braking action on the governor, means for variably adjusting the pressure of the brake shoe on the brake surface to vary the braking action, said means including a pivoted operating lever, a transmitting element between the lever and the shoe for moving the shoe when the lever is moved, and a connection between the transmitting element and the lever, constructed to permit disposing the lever in any one of a plurality of rotated positions about its pivot axis.

2. In a device of the class described, a rotary speed governor element, provided with a brake surface, a brake shoe adapted to frictionally engage the brake surface to exert a braking action on the governor, means for variably adjusting the pressure of the brake shoe on the brake surface to vary the braking action, said means including a pivoted operating lever, a transmitting element between the lever and the shoe for moving the shoe when the lever is moved, and a connection between the transmitting element and the lever, constructed to permit disposing the lever in any one of a plurality of rotated positions with respect to its pivot axis, said possible positions completely circumscribing the axis.

3. In a device of the class described, a main frame, a rotary speed governor mounted on the frame, and having an element provided with a brake surface, a brake shoe movably mounted on the frame, adapted to frictionally engage the brake surface to exert a braking action on the governor, means for moving the brake shoe to variably adjust the pressure of the brake shoe on the brake surface to vary the braking action, said means including an operating lever pivotally mounted on the main frame and rotatable completely about its pivot axis into any one of a plurality of adjusted positions, a transmitting element between the lever and the shoe for moving the shoe when the lever is rotatably moved, the transmitting element being adapted to be connected to the lever in any one of said adjusted positions.

4. In a device of the class described, a main frame, a rotary speed governor on the frame having an element, provided with a brake surface, a brake shoe adapted to frictionally engage the brake surface to exert a braking action on the governor, means for varying the pressure of the brake shoe on the brake surface to vary the braking action, said means including an operating lever pivoted on the main frame, and a transmitting element pivoted at one portion thereof on the main frame and at another portion thereof on the lever at a point radially spaced from the lever pivot axis, and the transmitting element engaging the shoe at a point between said portions for moving the shoe with a camming action when the lever is moved.

5. In a device of the class described, a main frame, a rotary speed governor on the frame having an element, provided with a brake surface, a brake shoe adapted to frictionally engage the brake surface to exert a braking action on the governor, means for varying the pressure of the brake shoe on the brake surface to vary the braking action, said means including an operating lever pivoted on the main frame, and a transmitting element pivoted at one portion thereof on the main frame and at another portion thereof on the lever at a point radially spaced from the lever pivot axis, and the transmitting element engaging the shoe at a point between said portions for moving the shoe with a camming action when the lever is moved, the pivot connection between the transmitting element and the lever being adapted to be shifted to any one of a plurality of positions on the lever around its axis.

6. In a device of the class described, a main frame, a rotary speed governor on the frame having an element, provided with a brake surface, a brake shoe adapted to frictionally engage the brake surface to exert a braking action on the governor, means for varying the pressure of the brake shoe on the brake surface to vary the braking action, said means including an operating lever pivotally mounted on the frame, an elongated transmitting element loosely mounted at one end portion on the frame, engaging the brake shoe at an intermediate portion and at an opposite end portion being connected to the operating lever at a point radially spaced from its axis of rotation.

7. In a device of the class described, a main frame, a rotary speed governor on the frame having an element, provided with a brake surface, a brake shoe adapted to frictionally engage the brake surface to exert a braking action on the governor, means for varying the pressure of the brake shoe on the brake surface to vary the braking action, said means including an operating lever pivotally mounted on the frame, an elongated transmitting element loosely mounted at one end portion on the frame, engaging the brake shoe at an intermediate portion and at an opposite end portion being connected to the operating lever at a point radially spaced from its axis of rotation, the connection between the transmitting element and the lever being constructed to permit its being detached from the lever and reattached thereto after adjustably rotating the lever into any one of a plurality of predetermined positions disposed completely around its rotational axis.

8. In a phonograph motor speed controlling mechanism, a main frame, a motor, a motor shaft, a speed governor associated with the shaft, and having an element provided with a brake surface, a brake shoe movably mounted on the frame adapted to frictionally engage the brake surface to exert a braking action on the governor to regulate the speed of the motor shaft to a substantially constant value, means for moving the brake shoe to vary the pressure thereof on the brake surface to variably adjust said constant speed value, said means including an operating lever pivotally mounted on the frame, and provided with a plurality of recesses annularly disposed around its pivot axis, a shaft loosely mounted at one end on the frame, engaging the brake shoe at an intermediate portion and loosely mounted at its other end in one of said recesses, whereby on rotary movement of the lever, the shoe may be moved, and whereby the lever may be adjustably positioned in any one of a plurality of positions annularly disposed around its rotational axis and whereby in any adjusted position the shaft may be engaged with a corresponding recess.

9. In a device of the class described, a main frame, a rotary speed governor, a movable brake shoe frictionally engaging the governor, an operating lever pivotally mounted on the frame, a movable transmitting element having a stationary pivot on the main frame and pivotally connected to the lever at a point radially spaced from its pivot axis and engaging the shoe at an intermediate portion whereby on rotary movement of the lever, the corresponding portion of the transmitting element is moved through an arcuate path and the intermediate portion is caused to engage the shoe with a camming action to move it to vary the braking action thereof.

10. In a device of the class described, a main frame, a rotary speed governor, a movable brake shoe frictionally engaging an element of the governor, a movable transmitting element engaging the shoe to move it to vary the braking action thereof, an operable means for adjustably oscillatingly moving the transmitting element, the transmitting element being pivoted at one portion to the main frame and at another portion being pivoted to the operable means, and bodily oscillatable around an axis through the pivot.

11. In a device of the class described, a main frame, a rotary speed governor, a movable brake shoe frictionally engaging an element of the governor, a movable transmitting element engaging the shoe to move it to vary the braking action thereof, an operable means for adjustably oscillatingly moving the transmitting element, the transmitting element being pivoted at one portion to the main frame and at another portion being pivoted to the operable means, and bodily oscillatable around an axis through the pivot.

12. In a device of the class described, a main frame, a rotary speed governor, a movable brake shoe frictionally engaging an element of the governor, a movable transmitting element engaging the shoe to move it to vary the braking action thereof, the path of movement of the said transmitting element disposed at an angle to the direction of shoe movement, operable means for moving the transmitting element, said transmitting element pivoted at one portion to the main frame and at another portion to the operable means.

13. In a device of the class described, a main frame, a rotary speed governor, a movable brake shoe frictionally engaging an element of the governor, a movable transmitting element engaging the shoe to move it to vary the braking action thereof, an operating lever pivotally connected to the main frame, and the transmitting element being pivoted at one portion to the frame and at another portion to the movable portion of the lever.

14. In a device of the class described, a main frame, a rotary speed governor, a movable brake shoe frictionally engaging an element of the governor, a movable transmitting element engaging the shoe to move it to vary the braking action thereof, an operating lever pivoted to the main frame, and adapted to take up a plurality of adjusted positions about its pivot center and movable through a range of movement at each adjusted position, the transmitting element being pivoted to the frame and to the lever and engaging the shoe at a point between said pivots for moving the shoe with a camming action when the lever is moved through said range.

15. In a device of the class described, a main frame, a rotary speed governor, a movable brake shoe frictionally engaging an element of the governor, a movable transmitting element movable through a range of movement and engaging the shoe to move it to vary the braking action thereof, an operating lever adapted to take up any one of a plurality of operative positions and adapted to operatively engage the transmitting element in each position.

16. In a device of the class described, a main frame, a rotary speed governor, a movable brake shoe frictionally engaging an element of the governor, a movable transmitting element movable through a range of movement and engaging the shoe to move it to vary the braking action thereof, an operating lever adapted to take up any one of a plurality of operating positions and adapted to operatively engage the transmitting element in each position to move it through said range, the transmitting element moving at an angle to the direction of movement of the shoe.

17. In a device of the class described, a main frame, a rotary speed governor, a movable brake shoe frictionally engaging an element of the governor, a movable transmitting element movable through a range of movement and engaging the shoe to move it to vary the braking action thereof, a pivoted operating lever adapted to be placed in any one of a plurality of rotated positions about its pivot center and adapted to operatively engage the transmitting element in each position to move it through said range of movement.

18. In a device of the class described, a main frame, a rotary speed governor, a movable brake shoe frictionally engaging an element of the governor, a movable transmitting element movable through a range of movement and engaging the shoe to move it to vary the braking action thereof, a pivoted operating lever adapted to be placed in any one of a plurality of rotated positions about its pivot center and adapted to operatively engage the transmitting element in each position to move it through said range of movement, the transmitting element moving at an angle to the direction of movement of the shoe.

FRITZ van der WOUDE.